(12) United States Patent
    Naccache

(10) Patent No.: US 9,886,602 B2
(45) Date of Patent: Feb. 6, 2018

(54) MAGNETIC HEAD FOR PAYMENT TERMINAL

(71) Applicant: INGENICO GROUP, Paris (FR)

(72) Inventor: David Naccache, Paris (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/113,912

(22) PCT Filed: Jan. 23, 2015

(86) PCT No.: PCT/EP2015/051416
    § 371 (c)(1),
    (2) Date: Jul. 25, 2016

(87) PCT Pub. No.: WO2015/110610
    PCT Pub. Date: Jul. 30, 2015

(65) Prior Publication Data
    US 2016/0350562 A1    Dec. 1, 2016

(30) Foreign Application Priority Data
    Jan. 24, 2014 (FR) ..................... 14 50633

(51) Int. Cl.
    G06K 19/06    (2006.01)
    G06K 7/08     (2006.01)

(52) U.S. Cl.
    CPC .............. G06K 7/087 (2013.01); G06K 7/084 (2013.01)

(58) Field of Classification Search
    CPC ....... G06K 19/06187; G06K 19/06196; G06K 19/18

USPC .................................................. 235/493, 449
See application file for complete search history.

(56) References Cited

U.S. PATENT DOCUMENTS

| 5,091,811 | A | * | 2/1992 | Chang | ..................... | G11B 5/55 360/2 |
| 5,270,523 | A | * | 12/1993 | Chang | .................... | G06K 7/015 235/449 |
| 2011/0192903 | A1 | | 8/2011 | Berthiaud | | |
| 2014/0021255 | A1 | | 1/2014 | Lo et al. | | |

FOREIGN PATENT DOCUMENTS

| EP | 2405427 A1 | 1/2012 |
| WO | 9313498 A1 | 7/1993 |

OTHER PUBLICATIONS

Preliminary Search Report from FR 1450633 dated Oct. 24, 2014.
International Search Report from PCT/EP2015/051416 dated Mar. 30, 2015, de Ronde Jan.

* cited by examiner

*Primary Examiner* — Daniel St. Cyr
(74) *Attorney, Agent, or Firm* — BCF LLP

(57) ABSTRACT

The invention relates to a magnetic reading head to be mounted in a terminal, said head having a generally rectangular parallelepiped shape and comprising a face for reading data coming from a magnetic stripe, said face comprising at least one component for reading data coming from a magnetic stripe.
According to the invention, such a magnetic reading head comprises at least one flexible printed circuit board for protection against electromagnetic disturbances, said flexible printed circuit board being positioned on at least one face different from said reading face.

9 Claims, 4 Drawing Sheets

MAGNETIC HEAD FOR PAYMENT TERMINAL

CROSS-REFERENCE TO RELATED APPLICATION

Figure 1:
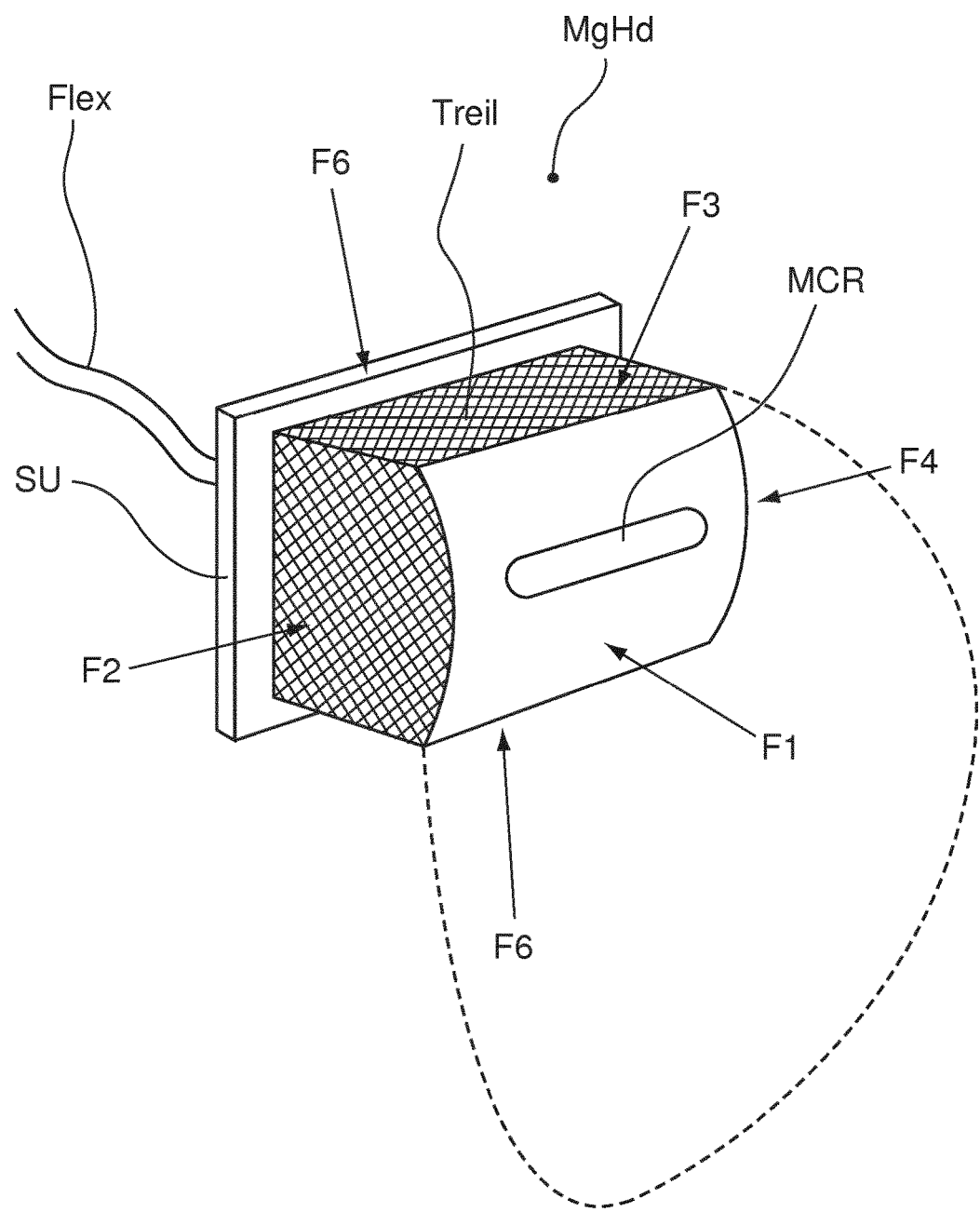

This United States National Stage patent application of International Patent Application PCT/EP2015/051416 filed on Jan. 23, 2015 claims priority from French Patent Application Serial No. 14 50633 filed on Jan. 24, 2014, the entire content of which are incorporated herein by reference.

FIELD OF THE INVENTION

The invention relates to the field of payment terminals. The invention relates more particularly to the field of payment terminals comprising magnetic reading heads. Such payment terminals are used read bank data present in a card comprising magnetic tracks.

PRIOR ART

Payment terminals are mainly used to enable payment for purchases of goods and services at sales points. These terminals generally comprise a smart-card reader and a magnetic-card reader. They also include a screen used especially to view the amounts of the transactions. They also have a keypad for entering these amounts as well as confidential codes entered by the customers, or else they have a touch screen. These payment terminals generally have a battery, which enables them to work autonomously. The magnetic card reader generally takes the form of a slot made lengthwise on the payment terminal. This slot is used to slide a magnetic card, for example, from the top downwards. This movement makes it possible to read the content of the magnetic stripe of the magnetic card. Indeed, the magnetic stripe passes before a magnetic head which reads the information recorded on the magnetic stripe of the card.

The payment terminal therefore comprises a magnetic reading head. Magnetic cards compatible with the ISO 7811 standard comprise a magnetic stripe with three recording tracks (generally called the ISO 1, ISO 2 and ISO 3 tracks). These tracks can contain information on the possessor of the card. In particular, information about a bank account and encrypted information is stored on such tracks.

The use of such magnetic cards is very widespread in the banking field for transactions with merchants. During such a transaction, a customer's magnetic card is inserted at the extremity of a slot (in which a magnetic reading head is present, on one of the faces of the walls forming the slot) in a payment terminal, and a translational motion of the card is made (the magnetic card is made to slide in this slot so that the magnetic stripe of the card is presented facing the extremity of the magnetic reading head). Thus, the extremity of the magnetic reading head comes into physical contact with the magnetic track of the magnetic card, and it measures the polarization of the magnetic particles on portions of the magnetic track considered (through the translational motion), and binary information is deduced therefrom.

During the translational motion of the magnetic card in the slot of the payment terminal, pressure is exerted on the magnetic reading head by the sliding of the magnetic card. Thus, a reading head should be capable of moving perpendicularly to the axis of translation of a card in the slot. In addition, the passage of a card in the slot may induce a slight tilting of the magnetic reading head relative to the axis perpendicular to the translational axis of the card.

In order to stabilize the magnetic reading head during the reading of a card, it is necessary to use a holding device for holding such a head (in order to limit the above-mentioned tilting, this function being called a "guidance of the magnetic reading head") which also, once the card has passed, is used to re-position the magnetic reading head at its original position (this function is called "a return or cushioning of the magnetic reading head").

Thus, it is ensured that the magnetic head is positioned as close as possible to the magnetic track to be read. However, until now, the subject of securing the data read by the magnetic head has been relatively neglected. Indeed, although the data present on the magnetic card is generally secured and although the transmission of this data to the securing processor of the terminal is also protected (for example by the use of secured flexible elements), the reading phase itself is relatively unsecured. Indeed, numerous disturbances can be read concomitantly with the phase for reading data on the magnetic card. Such disturbances can be taken advantage of by ill-intentioned individuals to try and modify the behavior of the terminal.

Thus, there is a need for a solution to secure the reading head of the payment terminal.

SUMMARY OF THE INVENTION

The invention, in at least one embodiment, does not have these drawbacks of the prior art. More particularly, the invention relates to a magnetic head to be inserted in a payment terminal. More particularly, such a reading head comprises an envelope for protection against electromagnetic disturbances.

More specifically, it is an object of at least one embodiment of the invention to provide a device for securing a magnetic reading head that is not bulky.

The invention relates more particularly to a magnetic reading head to be mounted in a terminal, said head having a generally rectangular parallelepiped shape and comprising a face for reading data coming from a magnetic stripe, said face comprising at least one component for reading data coming from a magnetic stripe.

According to one particular embodiment, said magnetic reading head comprises at least one envelope for protection against electromagnetic disturbances, said envelope being positioned on at least one face different from said reading face.

According to one particular characteristic, said envelope covers three faces of said magnetic reading head.

Thus, in this embodiment, the magnetic reading head defines a cone for reading data comprising at least one face for reading magnetic data and at least one other face.

According to one particular characteristic, said envelope covers four faces of said magnetic reading head. Thus, in this embodiment, the magnetic reading head defines a cone for reading data, limited to the face for reading magnetic data.

According to one particular characteristic, said envelope covers five faces of said magnetic reading head. Thus, in this embodiment, the magnetic reading head defines a data-reading cone limited to the face for reading magnetic data, and the rear face of the magnetic head cannot be accessed.

According to one particular embodiment, said envelope is constituted by an electromagnetic shielding.

According to one particular embodiment, said electromagnetic shield is a Faraday cage.

According to one particular embodiment, said Faraday cage comprises at least one flexible printed circuit board comprising a lattice of electrical tracks. Thus, such a cage can be easily manufactured subsequently to the manufacture of the magnetic reading head. The flexible printed circuit can then be glued to the faces of the magnetic head.

According to one particular embodiment, said Faraday cage is constituted by a copper layer deposited on the faces of said magnetic reading head. Such an embodiment is for example suited to a joint manufacture of the magnetic reading head and of the protective envelope.

According to another aspect, the proposed technique also relates to a payment terminal comprising at least one set of components for reading data coming from a card comprising a magnetic track and comprising a reading head as described above.

According to the invention, such a terminal comprises a configuration in which said reading head is positioned within an aperture of first lateral wall and in which a second lateral wall is situated facing the first lateral wall to define a slot for the insertion of a card comprising a magnetic reading track. According to the invention, the second lateral wall comprises at least one magnetic isolation device positioned so as to be facing the reading face of the magnetic head.

According to one particular characteristic, the electromagnetic isolation device takes the form of a flexible printed circuit board with a width and a height at least equal to the corresponding width and height of the reading face of the magnetic head.

LIST OF FIGURES

Figure 2:
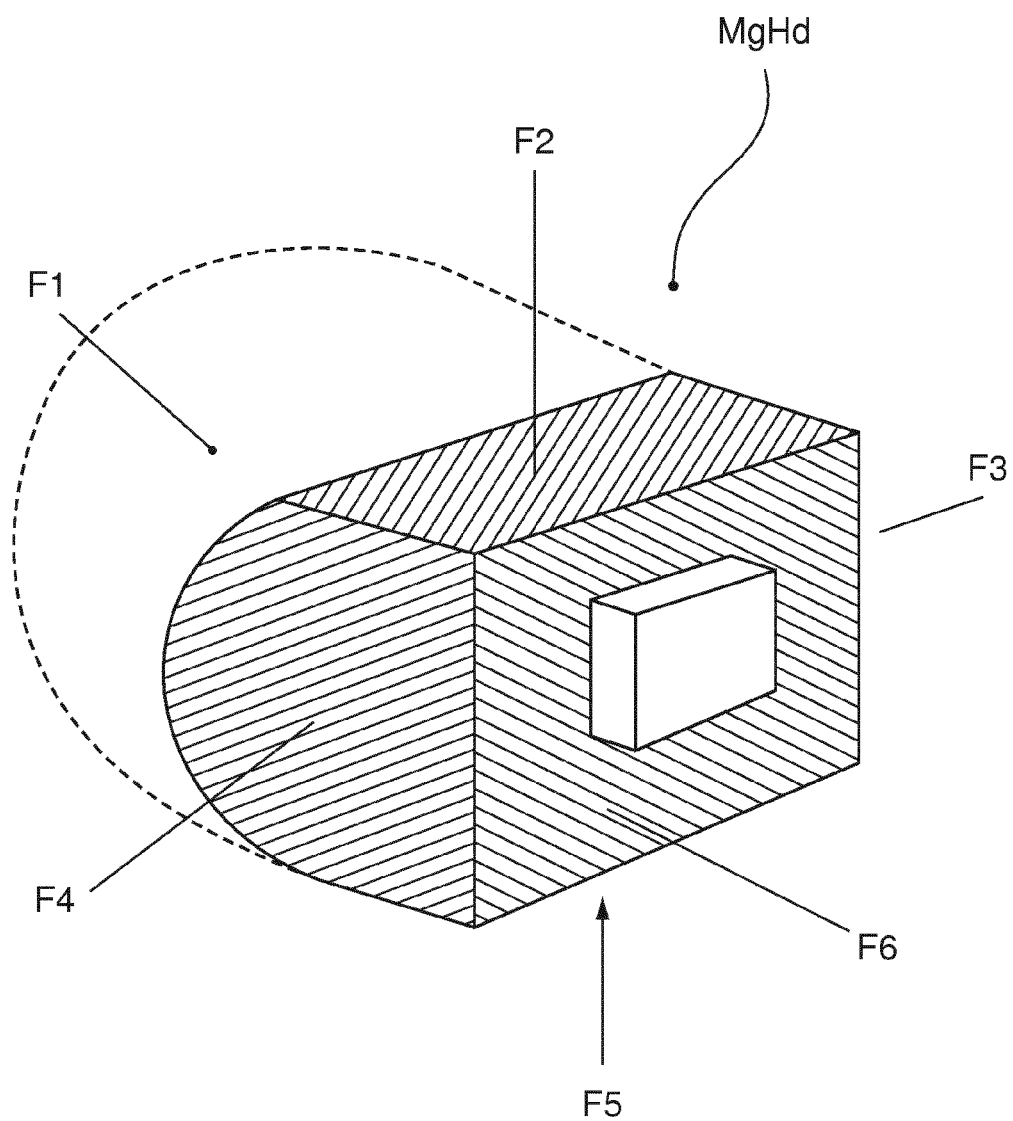
Figure 3:
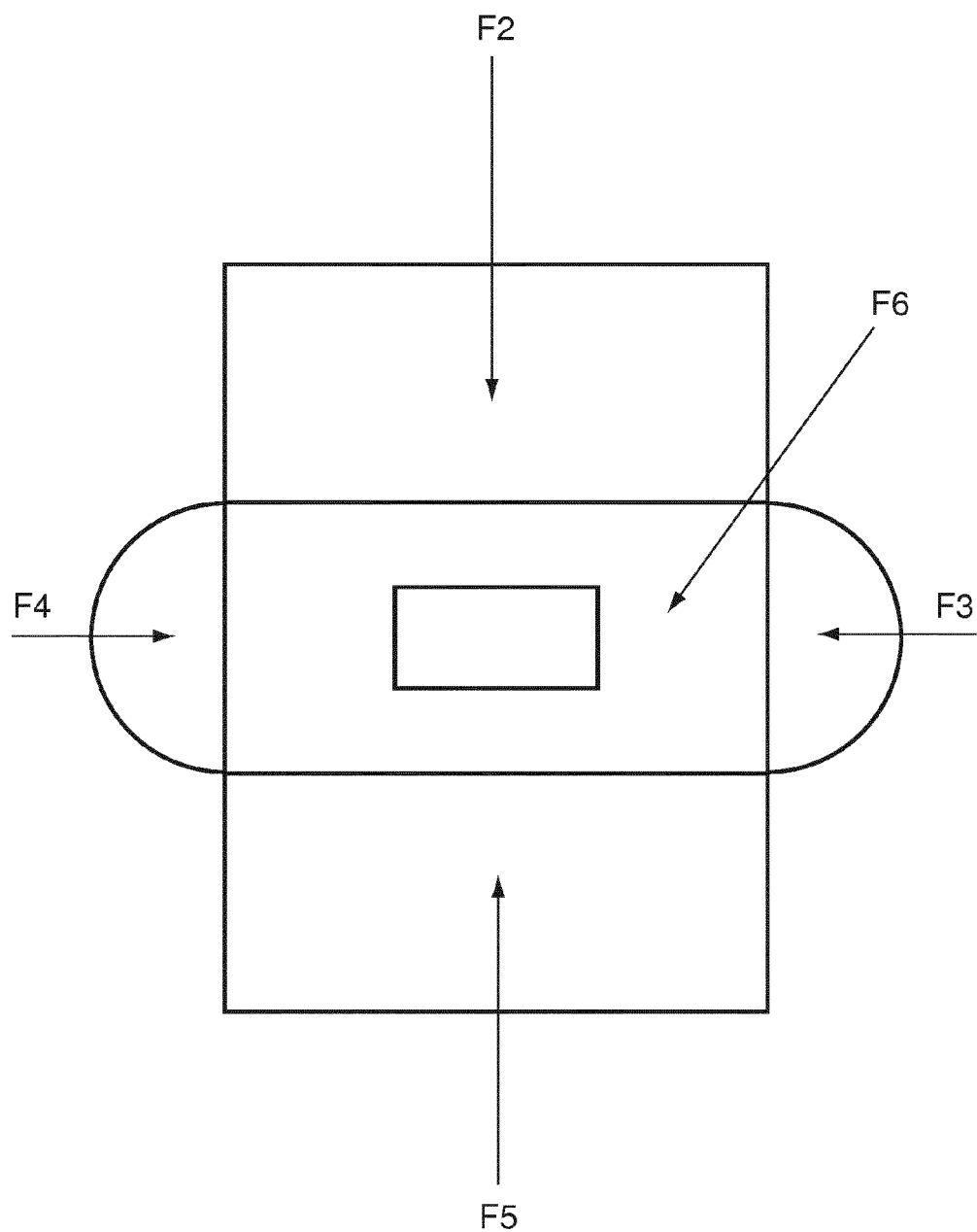
Figure 4A:
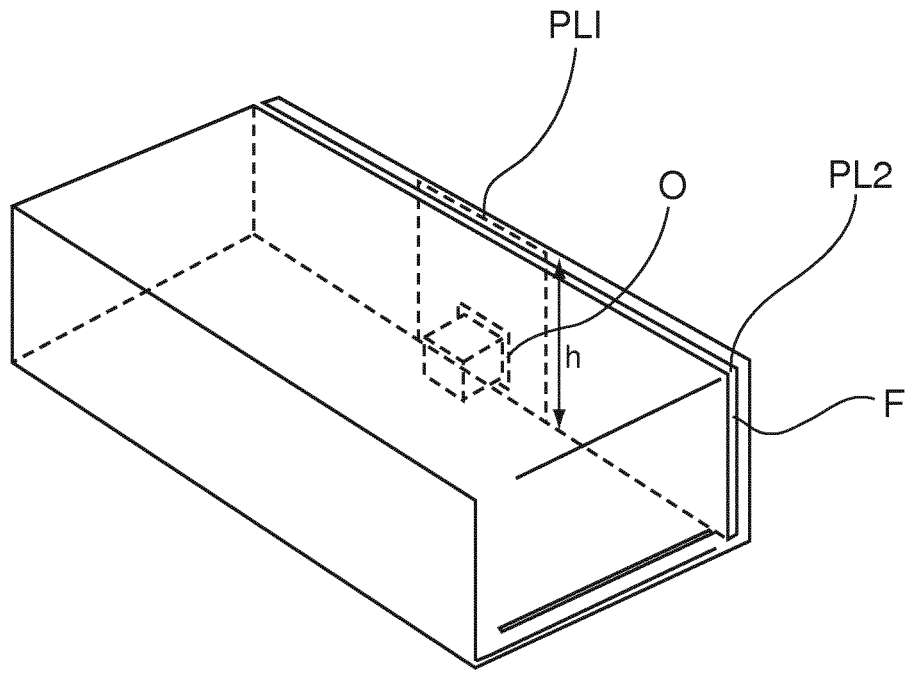
Figure 4B:
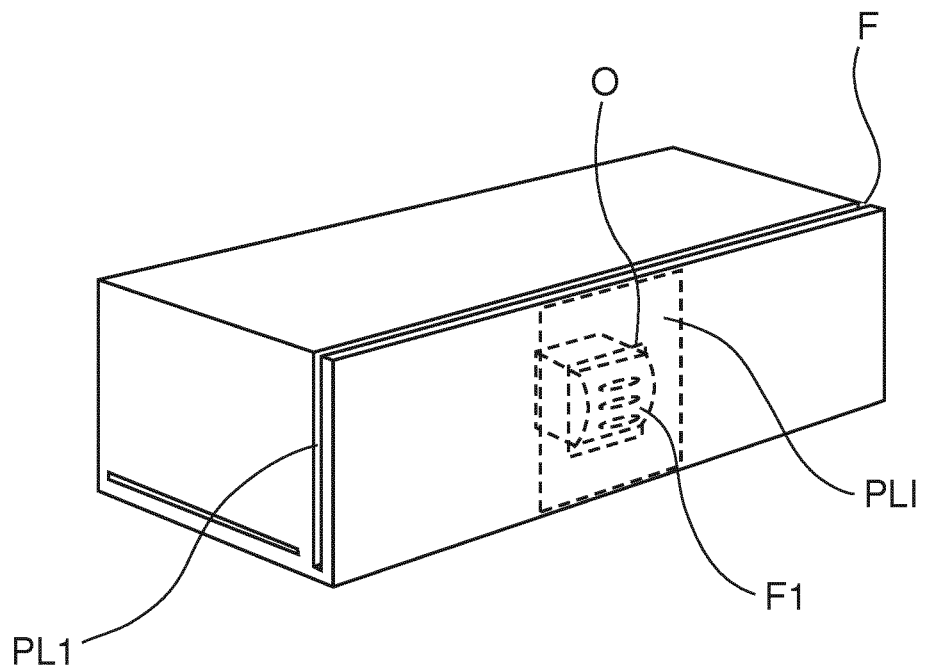

Other features and advantages of the invention shall appear from the following description, given by way of an indication and a non-exhaustive example and from the appended drawings of which:

FIG. 1 presents a first embodiment of a secured magnetic reading head:

FIG. 2 presents a second embodiment of a secured magnetic reading head:

FIG. 3 presents a pattern of a Faraday cage made in a flexible printed circuit board:

FIGS. 4a and 4b illustrate a complementary embodiment associated with a complementary isolation device.

DETAILED DESCRIPTION

In all the figures of the present document, the identical elements and steps are designated by one and the same numerical reference. As indicated above, it is necessary to provide a securing for the magnetic reading head of the payment terminal. Such a securing meets first of all the need to limit nuisance caused by other electromagnetic disturbances which may occur during the reading of the magnetic card. Such securing also meets the need to avoid any theft or misuse of data read by the magnetic card. To this end, according to the invention, an external envelope is added to the magnetic head. This external envelope is aimed at isolating the magnetic head from the electromagnetic fields which might disturb its operation. Such an envelope is used especially to limit any attempt at theft made possible by the current architecture of magnetic heads and payment terminals.

In at least one embodiment, a magnetic head that is the object of the present disclosure has a generally rectangular parallelepiped shape. This rectangular parallelepiped has a slightly domed face comprising the reading components of the reading head. These components are used to read the information by measuring the polarization of the magnetic particles (iron oxide) included in a flexible substrate. Usually, these components can be called electromagnets. They offer the function of converting the magnetic field of the stripe into an electrical field. The electrical signals obtained are conveyed up to a processor which takes charge of converting them into usable data.

According to prevailing standards, depending on the quantity and layout of the data on the magnetic tracks, the magnetic head can include one, two or three electromagnets.

According to the proposed technique, the magnetic head is provided with an envelope. This envelope fulfils two distinct functions. The first function is that of protecting the reading of the data. Indeed, the envelope provides a sort of barrier around the magnetic head, thus preventing electromagnetic disturbances from impairing the data read by the magnetic head. The second function of this envelope is to impose a direction of reading of the data. Indeed, although the electromagnet (or the electromagnets) of the magnetic head are theoretically positioned so as to be facing the magnetic track to be read, the reading of data by this magnetic track is not necessarily limited vertically to the electromagnet. On the contrary, the envelope used in the proposed technique makes sure that the data can be read only vertically with respect to the magnetic head, or at least in a predefined (conical) zone, the apex of which is situated appreciably at the level of the electromagnet or electromagnets of the magnetic head.

According to the proposed technique, the envelope covers for example three sides of the rectangular parallelepiped. More particularly, as indicated with reference to FIG. 1 and FIG. 2, the magnetic reading head (MgHd) comprises six faces (F1 . . . F6). One of these faces (F1) is domed and comprises at least one magnetic track reading component (MCR) (for example an electromagnet). This face (F1) is called the front face. The magnetic reading head (MgHd) also has a rear face (F6). This face is linked (or connected or fixed) to a magnetic head support (Su). The magnetic head support is used both to connect the magnetic head to a printed circuit board (by means of a flexible ribbon cable (Flex), for example) and to carry out an affixing of the magnetic head. The electrical signals are transmitted by means of this ribbon cable (Flex) to the processor (not shown). In one particular embodiment, the envelope covers three faces of the magnetic head (F2, F3, F4). The envelope has three properties of absorption or deflection of electromagnetic rays. In one particular embodiment, the envelope is a passive component not electrically connected to the terminal. In one particular embodiment, the envelope is a Faraday cage. The cone for reading data by means of the reading head is represented in FIG. 1 in dashes. As explained in this FIG. 1, since the envelope covers only three sides, this cone has a particular shape. This embodiment in which only three sides are covered by the envelope can have its utility, for example when an electromagnetic barrier already exists at the bottom of the payment terminal. Such a situation can for example occur when the terminal is secured to prevent any intrusion into this terminal. This securing can be done by components that induce a blockage of the electromagnetic waves, for example at the lower half-shell of the terminal: a terminal is constituted as a rule by a lower half-shell and an upper half-shell which are joined to each other to form the shell of the terminal. It frequently happens that these half-shells comprise securing devices which can induce an electromagnetic barrier. This means that, depending on the manufacturing processes, it can be economically advantageous not to place an envelope on the entire magnetic head.

According to another embodiment, the magnetic head is covered with an envelope on four of its faces (F2 to F5). This embodiment is adapted to a direct integration of the envelope during the manufacture of the magnetic head as described below. In this second embodiment, the cone representing the range of reading of data by the magnetic head is reduced (FIG. 2). Hence, it is then no longer possible to interfere with the magnetic head. More particularly, the volume of reception of interference, represented by the cone, is reduced at the face F1, which is the face used to read the data of the magnetic card. Thus, it is appreciably more complicated to interfere with the head during the reading of data of the magnetic card. Thus, the securing of this portion of the payment terminal is increased in a simple way.

According to another embodiment, the envelope covers two sides: these can be for example lateral faces of the reading head: such a situation can be advantageous when shields are already present in the lower half-shell and the upper half-shell of the terminal, for example in order to make the reading head resistant to attacks.

According to another embodiment, the envelope covers only one side, for example the rear face of the reading head. This is advantageous when this rear face has to be protected against rear transmission and when it is not necessary to provide for special protection of the other faces. However, this case does not come up frequently in the proposed technique (namely the field of payment terminals).

As indicated above, the envelope covering the magnetic head can take the form of a Faraday cage. In one particular embodiment, this Faraday cage is made by means of a flexible printed circuit board (Flex) comprising a lattice (Treil) of electrical tracks, as shown in FIG. 3. The flexible printed circuit board (Flexible) is bonded to the magnetic head after the manufacture of this head. In this embodiment, the flexible printed circuit board is a passive component. It is not electrically connected to the terminal (or else it is connected only to the ground of this terminal). In other embodiments, the Faraday cage is made by means of a solid metallic sheet connected to ground, the pattern of which covers two, three, four or five faces of the magnetic reading head depending on need. Such an embodiment is adapted to implementing an envelope at the time of manufacture of the magnetic head: indeed, after this envelope has been made reliable, a material (for example a resin) is used to cover the entire magnetic heard. The three, four or five faces to be coated of the reading head are then sprayed with a metallic layer (for example copper). The remaining faces, for example, the face F1 and the face F6, are then rid of the coat of resin (if necessary) and the head can be mounted on a terminal.

Complementarily, in order to make sure that it will not be possible to transmit data from a stolen bank card to the magnetic reading head in front of this head, an additional protection device is added in front of the magnetic head when it is mounted on the terminal.

More particularly, this electromagnetic isolation device is used to make sure that only a magnetic card can be used to provide information to the magnetic head. Thus, this technique makes it possible, complementarily, to prevent devices (which imitate the shape factors of magnetic track cards) from being used to fraudulently transmit information to the magnetic head of the reader.

This embodiment is described with reference to FIGS. 4a and 4b. In this embodiment, in addition to the envelope described above, the first face (F1) of the reading head is protected by an electromagnetic isolation device. In this embodiment, as usual, the front face of the reading head (F1), owing to its domed shape, extends slightly beyond an aperture (O) provided for this purpose. This protrusion of the magnetic head goes beyond into a slot (F) formed by a lateral wall (PL1) at the level of the magnetic head and a lateral wall (PL2) facing the front face of the reading head (F1). The slot thus obtained has a thickness appreciably equal to the thickness of a card (standards ISO 7810 and ISO 7813).

According to the proposed technique, in order to prevent data from being possibly transmitted without any use of a card, the lateral wall (PL2) comprises an electromagnetic isolation device (PLI) which for example takes the form of a plate or a printed circuit board. This isolation plate (PLI) prevents the propagation of electromagnetic waves. It can take several forms. It can be a solid (metallic) plate. It is positioned inside a free space of the lower half-shell or the upper half-shell (depending on the way in which the terminal has been built). The height "h" of this plate is at least equal to the corresponding height of the magnetic head. According to one particular embodiment, the size of this plate is at least equal to twice the height of the magnetic head.

In one particular embodiment, this plate is formed by means of a flexible printed circuit board. This embodiment has the advantage of not requiring the use of a solid metal plate and can be made at lower cost, for example by affixing either a metallic lattice or a solid copper sheet to the printed circuit board.

This flexible printed circuit board, like the plate, can be connected to the ground of the terminal in order to define a determined potential. As an alternative, this flexible printed circuit board, like the plate, can be connected to a processor so as to become an active component for the elimination of electromagnetic interference.

The invention claimed is:

1. A magnetic reading head to be mounted in a terminal, said magnetic reading head having a generally rectangular parallelepiped shape and comprising a reading face for reading data coming from a magnetic stripe, said reading face comprising at least one component for reading data coming from the magnetic stripe, said magnetic reading head comprising at least one flexible printed circuit for protection against electromagnetic disturbances, said at least one flexible printed circuit being positioned on at least one face different from said reading face.

2. The magnetic reading head of claim 1, wherein said at least one flexible printed circuit board covers three faces of said magnetic reading head.

3. The magnetic reading head of claim 1, wherein said at least one flexible printed circuit board covers four faces of said magnetic reading head.

4. The magnetic reading head of claim 1, wherein said at least one flexible printed circuit board covers five faces of said magnetic reading head.

5. The magnetic reading head of claim 1, wherein said at least one flexible printed circuit board is constituted by an electromagnetic shielding.

6. The magnetic reading head of claim 5, wherein said electromagnetic shielding is a Faraday cage.

7. A payment terminal comprising at least one set of components for reading data coming from a card comprising a magnetic stripe and comprising a magnetic reading head, the magnetic reading head comprising a generally rectangular parallelepiped shape and comprising a reading face for reading data coming from the magnetic stripe, said reading face comprising at least one component for reading data coming from the magnetic stripe, said magnetic reading head comprising at least one flexible printed circuit for protection against electromagnetic disturbances, said at least one flexible printed circuit being positioned on at least one face different from said reading face.

8. The payment terminal of claim 7, wherein said magnetic reading head is positioned within an aperture of a first lateral wall and wherein a second lateral wall is situated facing the first lateral wall to define a slot for the insertion of the card comprising the magnetic stripe, said second lateral wall comprising at least one electromagnetic isolation device positioned so as to be facing the reading face of the magnetic reading head.

9. The payment terminal of claim 8, wherein said at least one electromagnetic isolation device takes the form of a flexible printed circuit board with a width and a height at least equal to a corresponding width and a corresponding height, respectively, of the reading face of the magnetic reading head.

* * * * *